United States Patent
Durham et al.

(10) Patent No.: US 7,441,272 B2
(45) Date of Patent: Oct. 21, 2008

(54) TECHNIQUES FOR SELF-ISOLATION OF NETWORKED DEVICES

(75) Inventors: David M. Durham, Hillsboro, OR (US); Ravi Sahita, Beaverton, OR (US); Priya Rajagopal, Wharton, NJ (US); James Kardach, Saratoga, CA (US); Scott Hahn, Beaverton, OR (US); Raj Yavatkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 843 days.

(21) Appl. No.: 10/865,355

(22) Filed: Jun. 9, 2004

(65) Prior Publication Data

US 2006/0005245 A1    Jan. 5, 2006

(51) Int. Cl.
G06F 11/00 (2006.01)
G08B 23/00 (2006.01)
(52) U.S. Cl. .............................. 726/23; 714/4
(58) Field of Classification Search .................. 726/23
See application file for complete search history.

(56) References Cited

U.S. PATENT DOCUMENTS

| 5,421,006 | A | * | 5/1995 | Jablon et al. ................... 714/36 |
| 5,475,839 | A | * | 12/1995 | Watson et al. ................... 713/2 |
| 5,748,888 | A | | 5/1998 | Angelo et al. |
| 5,884,033 | A | | 3/1999 | Duvall et al. |
| 5,918,008 | A | * | 6/1999 | Togawa et al. ................. 726/24 |
| 5,991,881 | A | | 11/1999 | Conklin et al. |
| 6,141,757 | A | * | 10/2000 | Seeker et al. ................... 726/22 |
| 6,301,668 | B1 | | 10/2001 | Gleichauf et al. |
| 6,321,338 | B1 | * | 11/2001 | Porras et al. ................. 709/224 |
| 6,453,345 | B2 | * | 9/2002 | Trcka et al. ................. 709/224 |
| 6,598,081 | B1 | | 7/2003 | Coile et al. |
| 6,647,400 | B1 | * | 11/2003 | Moran ........................ 707/205 |
| 6,681,232 | B1 | * | 1/2004 | Sistanizadeh et al. ..... 707/104.1 |
| 6,725,378 | B1 | | 4/2004 | Schuba et al. |
| 6,772,334 | B1 | | 8/2004 | Glawitsch |
| 6,779,033 | B1 | | 8/2004 | Watson et al. |
| 6,789,203 | B1 | | 9/2004 | Belissent |
| 6,944,663 | B2 | | 9/2005 | Schuba et al. |
| 6,971,028 | B1 | * | 11/2005 | Lyle et al. ..................... 726/25 |
| 7,058,718 | B2 | | 6/2006 | Fontes et al. |
| 7,225,467 | B2 | * | 5/2007 | Dapp .......................... 726/23 |
| 2002/0032871 | A1 | | 3/2002 | Malan et al. |
| 2004/0008681 | A1 | | 1/2004 | Govindarajan et al. |
| 2004/0168085 | A1 | * | 8/2004 | Omote et al. ............... 713/201 |

(Continued)

OTHER PUBLICATIONS

Matthew M. Williamson, "Throttling Viruses: Restricting Propagation to Defeat Mailicious Mobile Code", Information Infrastructure Laboratory, HP Laboratories Bristol, HPL-2002-172, Jun. 17, 2002, pp. 1-7, Hewlett-Packard Company.

(Continued)

*Primary Examiner*—Matthew Heneghan
(74) *Attorney, Agent, or Firm*—Blakely, Sokoloff, Taylor & Zafman LLP (57) ABSTRACT

A technique for self-isolation of a network device that has been identified as potentially harmful. The network device may be isolated from the network except for an out-of-band communication channel that can be used for management purposes to restore or repair the device prior to the network connection being re-established.

27 Claims, 6 Drawing Sheets

U.S. PATENT DOCUMENTS

| | | |
|---|---|---|
| 2005/0149747 A1 | 7/2005 | Wesinger et al. |
| 2005/0276228 A1 | 12/2005 | Yavatkar et al. |
| 2006/0005245 A1 | 1/2006 | Durham et al. |
| 2006/0095961 A1 | 5/2006 | Govindarajan et al. |
| 2006/0095970 A1 | 5/2006 | Rajagopal et al. |

OTHER PUBLICATIONS

Matthew M. Williamson, "Throttling Viruses: Restricting Propagation to Defeat Mailicious Mobile Code", Information Infrastructure Laboratory, HP Laboratories Bristol, HPL-2002-172 (R.1), Dec. 10, 2002, ACSAC Conference-Las Vegas, NV, pp. 1-9, Hewlett-Packard Company.

J. Twycross & M.M. Williamson, "Implementing and Testing A Virus Throttle", Trusted Systems Laboratory, HP Laboratories Bristol, HPL-2003-103, May 21, 2003, pp. 1-11, Proceedings 12th USENIX Security Symposium—Aug. 4-8, 2003 in Washington, D.C., Hewlett-Packard Company.

Matthew M. Williamson, "Design, Implementation and Test of an Email Virus Throttle", Information Infrastructure Laboratory, HP Laboratories Bristol, HPL-2003-118, Jun. 30, 2003, pp. 1-10, Hewlett-Packard Company.

M.M. Williamson et al., "Virus Throttling", Virus Bulletin, Mar. 2003, pp. 8-11, Virus Bulletin Ltd, The Pentagon, Abingdon, Oxfordshire, OX14 3YP, England.

M.M. Williamson et al., "Virus Throttling for Instant Messaging", Digital Media Systems Laboratory, HP Laboratories Bristol, HPL-2004-81, May 5, 2004, pp. 1-10, Virus Bulletin Conference of Sep. 2004 in Chicago IL, Hewlett-Packard Company.

Office Action cited in U.S. Appl. No. 10/196,541 mailed on Jul. 20, 2006.

Schuba, et al., "Analysis of a Denial of Service Attack on TCP," IEEE, pp. 208-223. 1997.

Osman. et al., A Stateful Inspection Module Architecture, IEEE, pp. 259-265, 2000.

Berstein, e-mail message Re: SYN Flooding [info], p. 1, 2001, 1 pg.

Bernstein, "SYN cookies", pp. 1-3, 2001.

* cited by examiner

TECHNIQUES FOR SELF-ISOLATION OF NETWORKED DEVICES

RELATED APPLICATIONS

This U.S. Patent application is related to U.S. Patent application entitled "SELF-ISOLATING AND SELF-HEALING NETWORKED DEVICES" filed concurrently herewith.

TECHNICAL FIELD

Embodiments of the invention relate to network security functionality. More particularly, embodiments of the invention relate to techniques for allowing network devices to be self-isolating and/or self-healing.

BACKGROUND

Many current networked devices use traditional software mechanisms to detect intrusions such as viruses, worms and denial of service attacks based on known signatures or patterns. The software mechanisms monitor system behavior and/or incoming traffic and apply appropriately configured filters/signatures to the incoming traffic in order to determine whether or not a system has been infected or is being attacked. However, such an approach is reactive and requires prior knowledge of intrusions or attacks so that appropriate traffic or platform behavior filters can be used by the software mechanisms. Software based firewalls and intrusion detection techniques are susceptible to tamper and can even be circumvented or disabled.

Once infected by a worm/virus, the worm/virus can rapidly spread to other systems before a central management station can provide an updated signature or pattern for the new attack. Moreover, some of the worms/viruses consume significant network bandwidth thereby making it impossible for the remote administrators to reach the infected system and isolate it from the rest of the network. Thus, the entire network or a significant part of it can be infected before appropriate security measures can be taken. Traditional software-based mechanisms for protecting against viruses, worms and denial of service attacks are hence not optimal.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Overview

There is a need for a mechanism to isolate the infected system from the rest of the network as soon as possible. The isolation would allow the platform to identify if the host operating system or software-based security components are malfunctioning and to disable network connectivity to the host if needed. The platform can continue to allow remote access by trusted management server/administrator to remedy the problem.

In one embodiment, the platform component that performs the host side validation and device enabling/disabling acts as the platform circuit breaker and, thus, is capable of isolating an infected system from the network. This platform component is independent of the host operating system and can function even when the host operating system is compromised (e.g. platform circuit breaker functionality implemented on an embedded microcontroller).

The trigger to the circuit breaker can be software based or if needed completely outside the scope of the host operating system. One technique is to base the trigger off of periodic authenticated keep-alive messages from the host operating system resident security agents. If the platform circuit breaker component detects that the host operating system resident firewall applications or other security agents are not operating or configured correctly (e.g. agents turned off by a user or attacked by malicious code, operating system that does not have the latest software patches, host services that are not patched correctly etc.), the platform circuit breaker can disable the hardware network devices thereby preventing attacks from propagating into the network or to other platforms.

Described in greater detail below is a technique for isolation of a network device (e.g., a computer system) that has been identified as potentially harmful. Conceptually, the process of identifying a potentially harmful networked device and isolating the device may be referred to as a "network circuit breaker". In one embodiment, the network device may be isolated from the network except for an out-of-band communication channel that may be used for management purposes to restore or repair the device prior to the network connection being re-established. In the description that follows, the term "isolation" refers to both the condition of total network isolation as well as to the condition in which the host system maintains an out-of-band communications channel to the network (but blocks all other communications to the system).

Multiple mechanisms can be used to support self-isolating functionality. In one embodiment, an embedded agent within a system executes management functions that disable communications except for an out-of-band management communications channel that can be used for repair and/or restoration purposes. One or more embedded agents may operate independently of the operating system so that the self-isolation functionality is available even before the operating system is loaded (e.g., on bootup) and whether or not the operating system is functional.

In general, an embedded agent(s) may operate to disable or remove one or more communications devices in response to a determination that the network device is potentially harmful. In one embodiment, the embedded agent(s) may configure the configuration/control register for one or more communications interfaces to cause the network device to stop transmitting or receiving traffic, thereby isolating the host device from the network.

System Overview

Figure 1:
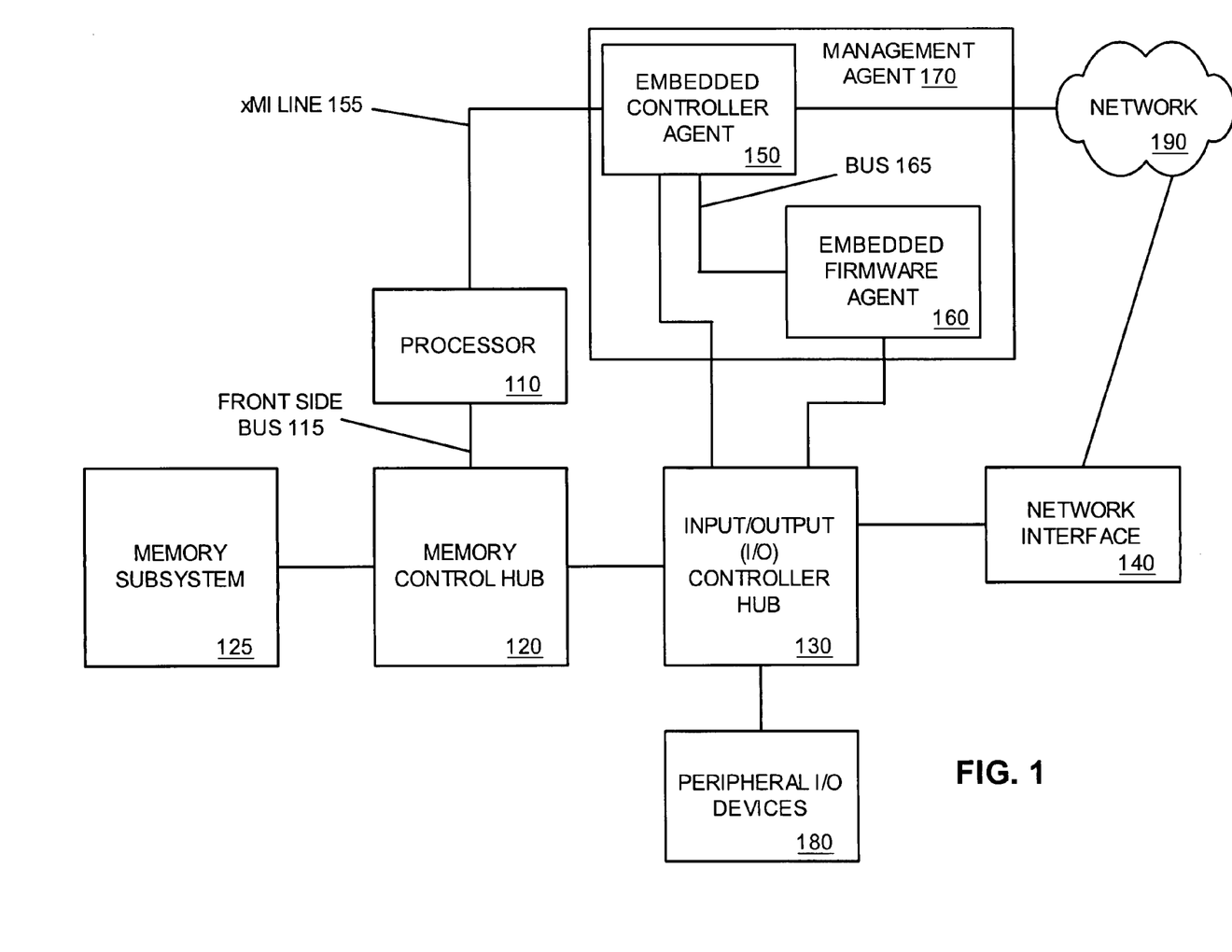
FIG. 1 is a block diagram of one embodiment of an electronic system having cooperative embedded agents.

FIG. 1 is a block diagram of one embodiment of an electronic system having cooperative embedded agents. The block diagram of FIG. 1 is intended to represent a broad category of electronic systems having network interfaces. The electronic system can be, for example, a desktop computer system, a mobile computer system, a server, a personal digital assistant (PDA), a cellular telephone, a set-top box, game console, satellite receiver, etc.

In one embodiment, processor 110 may be coupled to memory control hub 120 by front side bus 115. While the electronic system of FIG. 1 is described as having a single processor, multiple processor embodiments can also be supported. In an alternate embodiment, processor 110 may be coupled with memory control hub 120 by a shared system bus. Processor 110 can be any type of processor known in the art, for example, a processor from the Pentium® family of processors, the Itanium® family of processors, the Xeon® family of processors, available from Intel Corporation of Santa Clara, Calif. Other processors can also be used.

Memory control hub 120 may provide an interface to memory subsystem 125 that can include any type of memory to be used with the electronic system. Memory control hub (MCH) 120 may also be coupled with input/output (I/O) controller hub (ICH) 130. In one embodiment, ICH 130 may provide an interface between the system and peripheral I/O devices 180 as well as between the system and network interface 140, which will provide an interface to external network 190. Network 190 may be any type of network, whether wired or wireless, for example, a local area network or a wide area network.

Embedded controller agent 150 may be coupled with ICH 130 and with network 190. The connection between embedded controller agent 150 and network 190 is a logical connection and may be implemented through a network interface within embedded controller agent 150 or by sharing a network connection through network interface 140 in which management traffic is routed to embedded controller agent 150.

The network connection for embedded controller agent 150 may be independent of an operating system executed by processor 110. In one embodiment, all remote management traffic to and from embedded controller agent 150 may be communicated even in the absence of a host operating system. In one embodiment, embedded controller agent 150 may host a network management stack to support the out-of band communications. In one embodiment, embedded controller agent 150 may include a microcontroller or other type of processing circuitry, memory and/or interface logic. One embodiment of embedded controller agent 150 is described in greater detail below.

In one embodiment, embedded controller agent 150 may be coupled with processor 110 via an interrupt interface with, for example, the SMI pin of a Pentium® processor or with the PMI pin of an Itanium® processor (generically, xMI line 155). Other system interrupt signals may be used for other processors. In one embodiment, embedded controller agent 150 may be connected to MCH 120 through which the interrupt signal may be asserted. Alternatively, embedded controller agent 150 may be a part of the MCH 120 or embedded controller agent may be part of ICH 130. As another alternative, embedded controller agent 150 may be coupled with ICH 130 or embedded controller agent 150 may be part of network interface 140 or any IO device.

In one embodiment, ICH 130 may also be coupled with embedded firmware agent 160. In an alternate embodiment, firmware to be accessed by embedded controller agent 150 may be within embedded controller agent 150 or another system component. In one embodiment, embedded firmware agent 160 may be a mechanism that enables executable content in the form of one or more software drivers to be loaded into the System Management Mode (SMM) of an Intel 32-bit family of microprocessor (i.e., IA-32 processors), or the native mode of an Itanium-based processor with PMI signal activation. The state of execution of code in IA32 SMM is initiated by an SMI signal and that in Itanium™ processors is initiated by PMI signal activation; for simplicity, these will generally be referred to as SMM. In another embodiment, embedded controller agent 150 and/or embedded firmware agent 160 operate as described herein without the use of SMM.

In one embodiment, embedded controller agent 150 may be coupled with embedded firmware agent 160 via bi-directional agent bus 165. By communicating over bi-directional agent bus 165, embedded controller agent 150 and embedded firmware agent 160 may be configured to provide manageability and/or security functionality. Embedded controller agent 150 and embedded firmware agent 160 may be components of a single integrated circuit as management agent 170.

As described in greater detail below, embedded controller agent 150, embedded firmware agent 160 and/or ICH 130 may interact to allow the electronic device of FIG. 1 to be self-isolating from network 190. In one embodiment, embedded controller agent 150 and embedded firmware agent 160 operate to monitor the host electronic system to determine whether the electronic system should be isolated. Embedded firmware agent 160 and ICH 130 operate to prevent communications with network 160, for example, by disabling network interface 140.

In one embodiment, the connection between embedded controller agent 150 and network 190 is maintained for management and/or diagnostic purposes when the electronic system is otherwise isolated from network 190. That is, the electronic system under operating system control is isolated from network 190, while an out-of-band network connection that is independent of the operating system is maintained.

Figure 2:
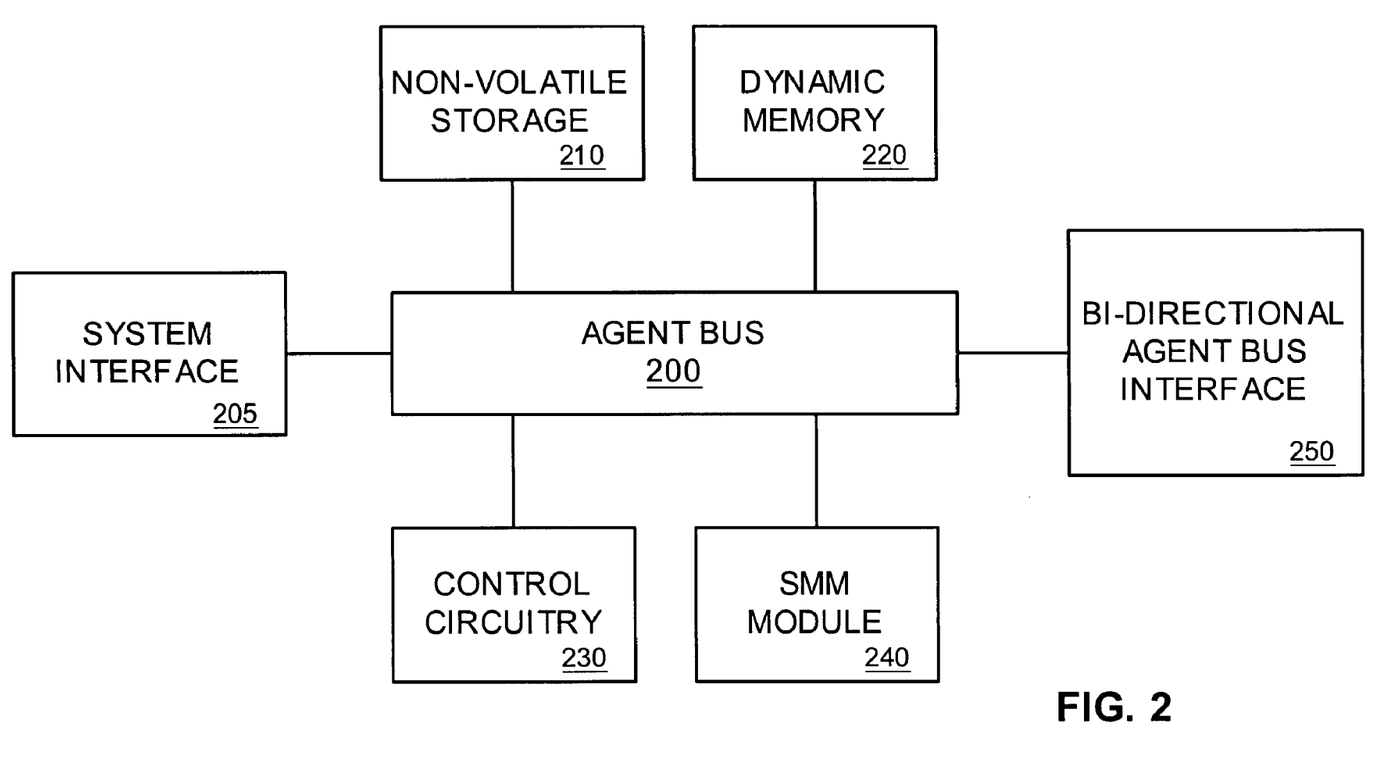
FIG. 2 is a block diagram of one embodiment of an embedded firmware agent.

FIG. 2 is a block diagram of one embodiment of an embedded firmware agent. In the example of FIG. 2 the embedded firmware agent may have an interface compliant with an Extensible Firmware Interface (EFI) as defined by the EFI Specifications, version 1.10, published Nov. 26, 2003, available from Intel Corporation of Santa Clara, Calif. In alternate embodiments, other firmware components can also be used.

In one embodiment, the embedded firmware agent may include agent bus 200 coupled with system interface 205. System interface 205 may provide an interface through which the embedded firmware agent communicates with the host system. The embedded firmware agent may further include bi-directional agent bus interface 250 that may be coupled with bus 200 to allow the embedded firmware agent to communicate with an embedded controller agent as described above.

In one embodiment, the embedded firmware agent further includes dynamic memory 210 that may be coupled with agent bus 200. Dynamic memory 210 may provide storage for instructions and/or data to be used during operation. The embedded firmware agent may further include non-volatile storage 220 that may be coupled with agent bus 200 to store static data and/or instructions.

In one embodiment, the embedded firmware agent may include control circuitry 230 coupled with agent bus 200 that may perform control operations and/or execute instructions provided by dynamic memory 210 and/or non-volatile storage 220. The embedded firmware agent may also include SMM module 240 coupled with agent bus 200. SMM module 240 can be any combination of elements that provide SMM functionality to the host system.

Figure 3:
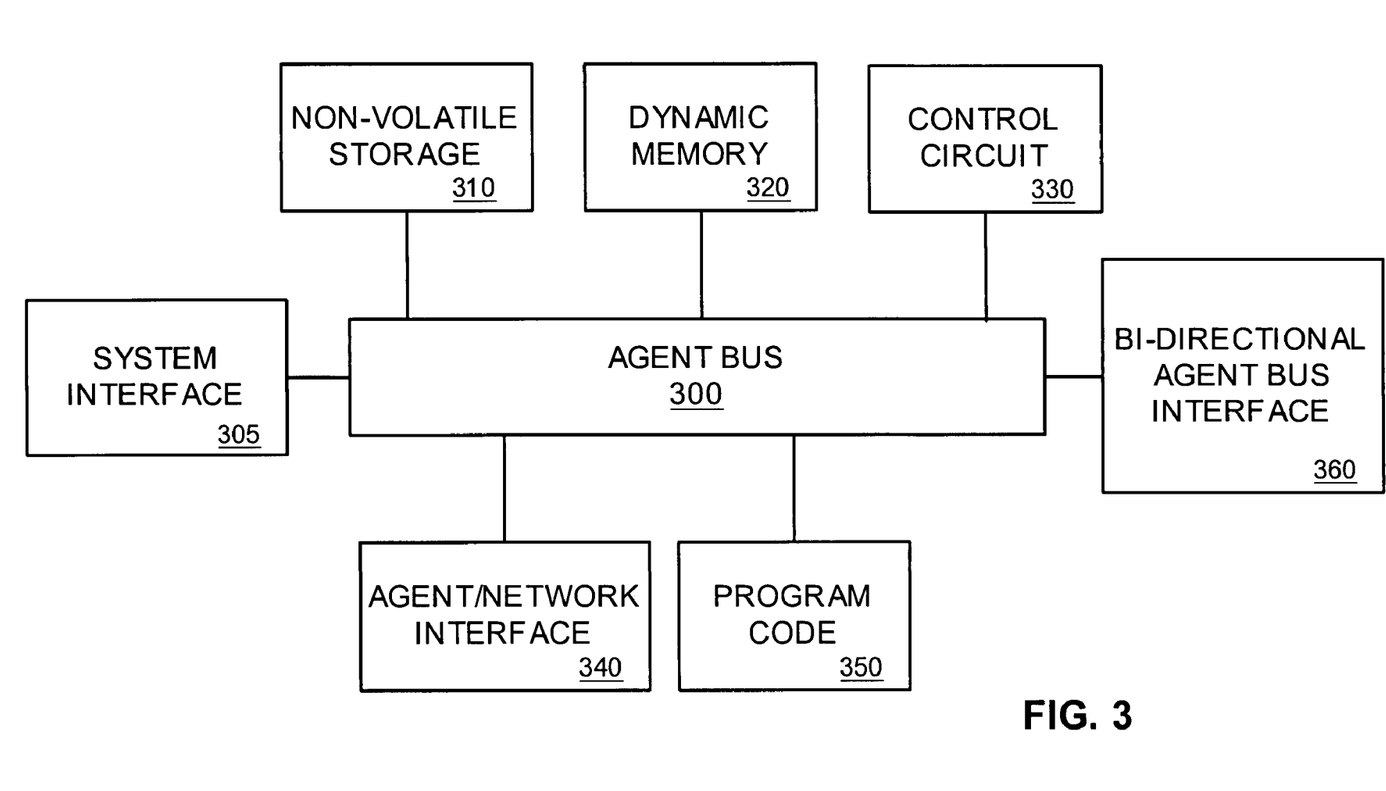
FIG. 3 is a block diagram of one embodiment of an embedded controller agent.

FIG. 3 is a block diagram of one embodiment of an embedded controller agent. In the example of FIG. 3 the embedded controller agent may be a microcontroller based system component that can operate as described herein. In alternate embodiments, other controller components can also be used.

In one embodiment, the embedded controller agent may include agent bus 300 coupled with system interface 305. System interface 305 may provide an interface through which the embedded controller agent communicates with the host system. The embedded controller agent may further include bi-directional agent bus interface 360 that may be coupled with bus 300 to allow the embedded controller agent to communicate with an embedded firmware agent as described above.

In one embodiment, the embedded controller agent further includes dynamic memory 310 that may be coupled with agent bus 300. Dynamic memory 310 may provide storage for instructions and/or data to be used during operation. The embedded controller agent may further include non-volatile storage 320 that may be coupled with agent bus 300 to store static data and/or instructions.

In one embodiment, the embedded controller agent may include control circuitry 330 coupled with agent bus 300 that may be implemented as a microcontroller perform control operations and/or execute instructions provided by dynamic memory 310 and/or non-volatile storage 320. Any type of microcontroller known in the art, or similar control circuitry, can be used.

The embedded controller agent may also include agent/network interface 340 coupled with agent bus 300. Agent/network interface 340 may provide a network connection for the embedded controller agent that is independent of the operating system and the network interface of the host system. Agent/network interface 340 may allow the embedded controller agent to communicate with remote devices independent of the operating system of the host system. This allows the embedded controller agent to perform manageability, security and/or other functions in a secure manner transparent to the operating system. The embedded controller agent may also include program code 350 communicatively coupled with bus 300.

Example Mechanisms for Self-Isolation and/or Self-Healing

Network worms and virus attacks have become a recurring threat in networked computing environments. For enterprise networks, such attacks can present a significant risk in terms of interference with business operations and possibly of intellectual property. Described herein are techniques for isolating an infected, networked device from the rest of the network.

In one embodiment, remote access can be allowed to trusted devices via an out-of-band network connection that operates independently of the networked device operating system. In one embodiment, the system component that acts as the platform "circuit breaker" is uniquely positioned to isolate the networked device from the network. In one embodiment, this circuit breaker component is capable of identifying if the system has been infected.

Multiple techniques for triggering network device isolation are described in the above-referenced, co-pending U.S. Patent application. One technique includes, for example, triggering self-isolation in response to absence of periodic authenticated messages from the host operating system, host resident firewall application and/or other host resident security components. Failure to receive the periodic messages from the monitored host components may be the result of the component being disabled or tampered with. Alerts from these monitored components indicating lack of appropriate security patches, positive results from a virus or memory scan can cause the device to be isolated until the trigger condition is resolved.

In one embodiment, security policies may be configured remotely by an administrator or other entity. The configuration may be provided via the out-of-band management communications. In addition to the events or conditions that trigger the network circuit breaker, other responses can be triggered based on the security policies. For example, if a virus causes files on a disk drive to be deleted or the drive to be formatted, the drive may be disabled using the techniques described herein. Thus, the circuit breaker functionality may be applied to any device coupled with the bus and is not limited to network communications.

Figure 4:
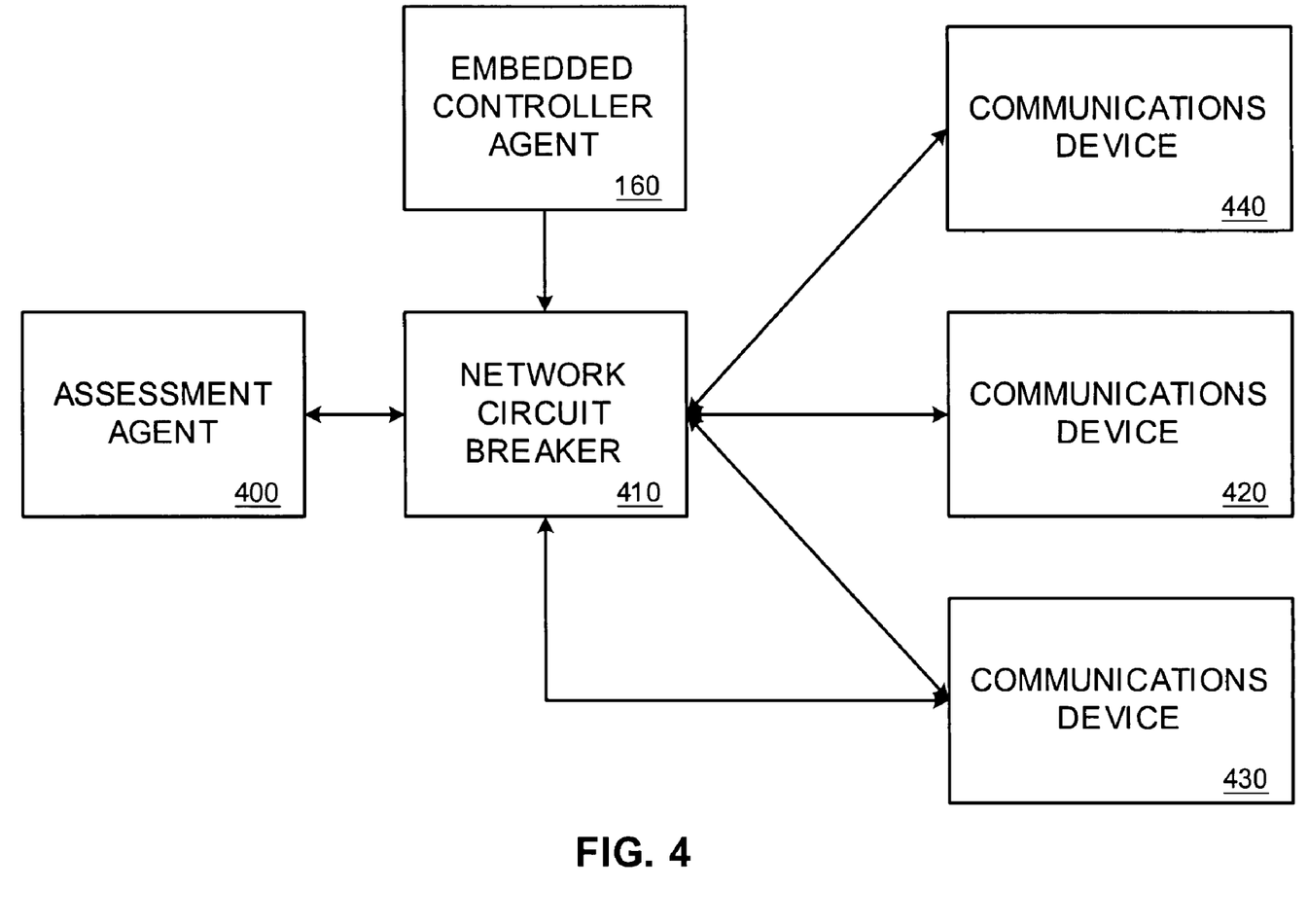
FIG. 4 is a conceptual diagram of one embodiment of a networked device circuit breaker.

FIG. 4 is a conceptual diagram of one embodiment of a networked device circuit breaker. In the example of FIG. 4, actions are taken to logically disable Peripheral Component Interconnect (PCI) devices (e.g., network interface controllers) to prevent communications with other remote devices on the network. While PCI devices are used as specific examples, the invention is not limited to control of PCI devices and can be applied to, for example, other platform buses that have hardware-based (register-based) enable/disable methods, or other logical, or extended system buses that can be disabled through control of appropriate configuration registers (e.g., USB buses or hubs, IEEE 1394 hubs). The PCI Special Interest Group of Portland, Oreg. manages the various PCI standards. Specific PCI standards and versions are discussed in greater detail below. IEEE 1394 interfaces and communication are described in an IEEE document entitled, "1394: Open Host Controller Interface Specification" Release 1.1, Jan. 6, 2000 as well as related and subsequent documents (e.g., IEEE 1394b).

Assessment agent 400 monitors the host system to verify that the security posture of the host system is correct. Alternatively, the embedded controller agent 160 may monitor inbound and outbound network traffic and analyze the traffic using appropriate heuristics to detect worm/virus propagating/infection activity. This may be accomplished by embedded controller agent 160 even in cases when the host resident anti-virus software has been circumvented/tampered or disabled. This type of analysis of network traffic using heuristics can effectively capture the behavior of worms or viruses. Other network traffic characteristics and/or risk assessment metrics can also be used.

As FIG. 4 is a conceptual block diagram, in one embodiment, the functionality of assessment agent 400 may be provided by embedded firmware agent 160 and/or an embedded controller agent as described above. Other components, for example, a general-purpose processor or a security processor may be use to implement assessment agent 400 and/or network circuit breaker 410. Assessment agent 400 is communicatively coupled with network circuit breaker 410. In one embodiment, the functionality of network circuit breaker 410 may also be provided by embedded firmware agent 160 and/or the embedded controller agent.

In one embodiment, using a PCI compliant bus, network circuit breaker 410 writes a value of 0x00 to the PCI Command register of the network interface to be disabled. Setting the register with this value disables the ability of the device to respond to PCI read/write/configuration cycles and interrupts effectively disabling the device. The PCI Local Bus Specification, Revision 2.3 published Mar. 29, 2002 as well as the PCI Express Base Specification, Version 1.0 published Jul.

23, 2002 and Version 1.0a published Oct. 7, 2003 define the PCI Command register of devices conforming to these specifications. Subsequent and related standards may also define a Command register or equivalent that can be used as described herein. Subsequent and related PCI standards include, for example, PCI-Express, PCI-X, PCI-AS (Advanced Switching). The description herein generically refers to all PCI standards mentioned or developed in the future that include a Command register or comparable functionality.

In one embodiment, a USB hub coupled with a PCI-compliant bus may be disabled using the techniques described. When the USB hub has been disabled, all USB-compliant devices coupled with the hub are disabled. Thus, if a network interface is USB-compliant, the network interface can be disabled by writing a value to a PCI Command register.

Communications devices 420, 430 and 440 represent any type of communications device that may allow a networked device communicate with remote devices. In one embodiment, one or more communications device (e.g., 430) has an out-of-band communications channel with network circuit breaker 410 and/or another component. The out-of-band communications channel may allow a trusted remote management device to communicate through communications device 430 to restore or repair the host network device. The out-of-band communications channel may be maintained, for example, by disabling a bus connection with communications device 430, but not disabling the connection between communications device 430 and network circuit breaker 410.

Figure 5:
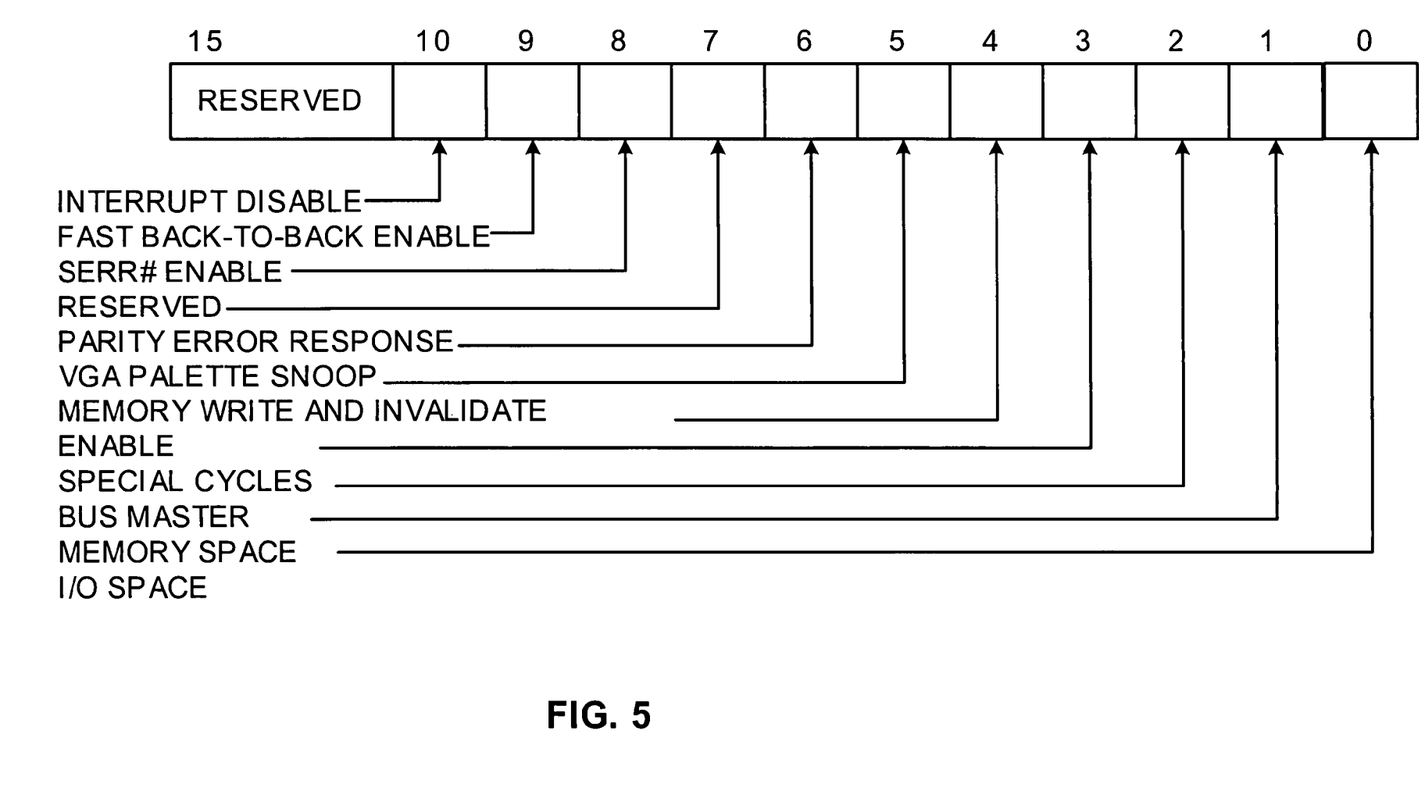
FIG. 5 is an illustration of a PCI Command register.

FIG. 5 is an illustration of a PCI Command register. The labels for the various bits of the register in FIG. 5 are specific to the PCI standards. In one embodiment, values are written to the PCI Command register using configuration cycles as defined in the PCI standards.

Figure 6:
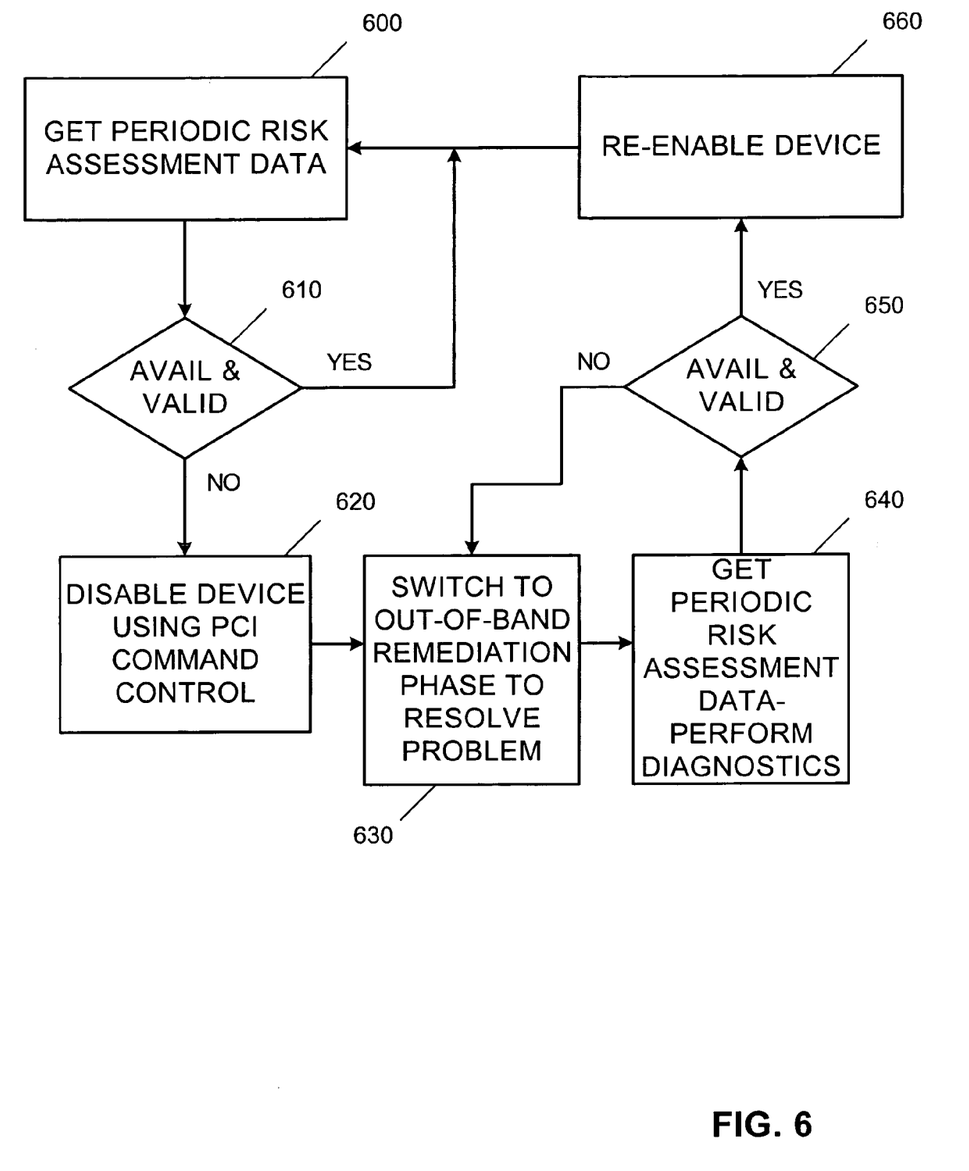
FIG. 6 is a flow diagram of one embodiment of a self-isolation procedure.

FIG. 6 is a flow diagram of one embodiment of a self-isolation procedure. The example of FIG. 6 includes an out-of-band (OOB) management mode for repair or restoration; however, the OOB management mode is not necessary for self-isolation of a network device.

Risk assessment herein refers to the ability to validate the security posture of the host that may include, for example, validating the configuration of the various host resident drivers, OS patch levels, anti-virus database files etc. Risk assessment data is periodically collected, 600. The risk assessment data can be collected in any manner. For example, in a device having an embedded firmware agent and an embedded controller agent, the embedded controller agent may periodically invoke SMM and perform a risk assessment scan of the host device. As another example, periodic "heartbeat" messages exchanged between a host-resident agent and the embedded controller agent. The host-resident agent is responsible for doing the host OS scan. The results may be analyzed by the embedded controller agent or by another host system component to determine whether an unacceptable risk condition exists.

If the risk assessment data is available and valid, 610, the periodic risk assessment process, 600, may be repeated. If the risk assessment data is not available and valid, 610, network access may be disabled using the PCI Command register value described above, 620. If the risk assessment data is not available, some component in the host system that is related to the risk assessment functionality may be inoperable for some reason, which may indicate a security risk in which case network access may be disabled. If the risk assessment data is not valid, a security risk may have been identified in which case network access may be disabled.

In one embodiment, after network access has been disabled, the host system may switch to a remediation phase to resolve the identified security risk, 630. When operating in the management mode, the host system may maintain an out-of-band network connection that may not be accessible by the host operating system that may be used to resolve the identified security risk. The out-of-band connection may be used, for example, to apply security patches or to remotely boot the host system. Other management and/or security operations can be performed.

While in remediation phase, the embedded controller may acquire periodic risk assessment data and/or perform diagnostic functions on the host device, 640. That is, the embedded controller may continue performing risk assessment operations, if the functionality has not been compromised, during the time that the host system is isolated from the network.

If, during the remediation phase, the risk assessment data is not available and valid, 650, the host system may be maintained in the remediation phase and isolated from the network, 630. If, during the remediation phase, the risk assessment data is available and valid, 650, the network communications device(s) may be re-enabled, 660. In one embodiment, when the network connection is re-enabled, the host device may switch out of the remediation phase and returns to normal operating condition during which risk assessments may be periodically performed.

CONCLUSION

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   performing a security analysis of a host electronic system coupled with a network;
   selectively disabling one or more devices coupled with a host bus in response to results of the security analysis; and
   maintaining an out-of-band network connection that is not accessible by a host operating system during the self-isolation to support remedial actions in response to the results of the security analysis.

2. The method of claim 1 wherein performing the security analysis of the host electronic system comprises:
   searching files of the host electronic system for predetermined indications corresponding to one or more predefined risk parameters; and
   generating an indication of a risk condition, if one or more of the predetermined conditions is found on the host electronic system.

3. The method of claim 2 wherein searching the files of the host electronic system for predetermined indications corresponding to one or more predefined risk parameters comprises:
   searching volatile memory of the host electronic system for the predetermined indications corresponding to the one or more predefined risk parameters; and searching non-volatile memory of the host electronic system for the predetermined indications corresponding to the one or more predefined risk parameters.

4. The method of claim 2 wherein the predetermined indications comprise one or more of: lack of communication from a component of the host electronic system within a predetermined period of time, lack of current security patches, operating during pre-selected hours and positive results from a virus or memory scan.

5. The method of claim 2 wherein the predefined risk parameters are administratively configured.

6. The method of claim 2 wherein the predefined risk parameters are received from a remote device.

7. The method of claim 1 wherein performing a risk assessment self-analysis of a host electronic system coupled with a network comprises:
monitoring network traffic with the host electronic system; and
generating an indication of a risk condition, if the network traffic is not within predetermined operating parameters.

8. The method of claim 7 wherein the predetermined operating parameters comprise: an acceptable network traffic volume, acceptable destinations, acceptable sources, acceptable operational time, acceptable traffic types identified by port, acceptable traffic types identified by protocol, acceptable traffic types identified by address and acceptable traffic types identified by header information.

9. The method of claim 1 wherein selectively self-isolating the host electronic system by disabling one or more network communications channels for the host electronic system in response to results of the risk assessment analysis comprises:
analyzing the risk assessment result to determine whether one or more risk conditions exists; and
logically disabling one or more network interface in response to a positive determination that one or more risk conditions exists.

10. The method of claim 9 wherein logically disabling one or more network interfaces in response to a positive determination that one or more risk conditions exists comprises writing a pre-selected value to a control register corresponding to the one or more network interfaces to be logically disabled using a configuration operation.

11. The method of claim 10 wherein writing a pre-selected value to a control register corresponding to the one or more network interfaces to be logically disabled using a configuration operation comprises writing the pre-selected value to a Peripheral Component Interconnect (PCI) Command register corresponding to each of the one or more network interfaces.

12. The method of claim 1 further comprising resolving a risk condition by communicating with a remote device via the out-of-band connection during self-isolation.

13. An article comprising a machine-readable medium having stored thereon instructions that, when executed, cause one or more processors to:
perform a risk assessment self-analysis of a host electronic system coupled with a network;
selectively self-isolate the host electronic system by disabling one or more network communications channels for the host electronic system in response to results of the risk assessment analysis; and
maintain an out-of-band network connection that is not accessible by a host operating system during the self-isolation to support remedial actions in response to the results of the security analysis.

14. The article of claim 13 wherein the instructions that cause the one or more processors to perform a risk assessment self-analysis of a host electronic system comprise instructions that, when executed, cause the one or more processors to:
search files of the host electronic system for predetermined indications corresponding to one or more risk conditions; and
generate an indication of a risk condition, if one or more of the predetermined conditions is found on the host electronic system.

15. The article of claim 14 wherein the instructions that cause the one or more processors to search the files of the host electronic system for predetermined indications corresponding to one or more predefined risk parameters comprise instructions that, when executed, cause the one or more processors to:
search volatile memory of the host electronic system for the predetermined indications corresponding to the one or more predefined risk parameters; and
search non-volatile memory of the host electronic system for the predetermined indications corresponding to the one or more predefined risk parameters.

16. The article of claim 14 wherein the predetermined indications comprise one or more of: lack of communication from a component of the host electronic system within a predetermined period of time, lack of security patches, operating during pre-selected hours and positive results from a virus or memory scan.

17. The article of claim 13 wherein the instructions that cause the one or more processors to selectively self-isolate the host electronic system by disabling one or more network communications channels for the host electronic system in response to results of the risk assessment analysis comprise instructions that, when executed, cause the one or more processors to:
analyze the risk assessment result to determine whether one or more risk conditions exists; and
logically disable one or more network interface in response to a positive determination that one or more risk conditions exists.

18. The article of claim 13 wherein the instructions that cause the one or more processors to perform the risk assessment self-analysis of a host electronic system coupled with a network comprise instructions that, when executed, cause the one or more processors to:
monitor network traffic with the host electronic system; and
generate an indication of a risk condition, if the network traffic is not within predetermined operating parameters.

19. The article of claim 18 wherein the predetermined operating parameters comprise: an acceptable network traffic volume, acceptable destinations, acceptable sources, acceptable operational time, acceptable traffic types identified by port, acceptable traffic types identified by protocol, acceptable traffic types identified by address and acceptable traffic types identified by header information.

20. The article of claim 17 wherein the instructions that cause the one or more processors to logically disable one or more network interfaces in response to a positive determination that one or more risk conditions exists comprise instructions that, when executed, cause the one or more processors to write a pre-selected value to a control register corresponding to the one or more network interfaces to be logically disabled using a configuration operation.

21. The article of claim 20 wherein the instructions that cause the one or more processors to write a pre-selected value to a control register corresponding to the one or more network interfaces to be logically disabled using a configuration operation comprise instructions that, when executed, cause the one or more processors to write the pre-selected value to a Peripheral Component Interconnect (PCI) Command register corresponding to each of the one or more network interfaces.

22. The article of claim 13 further comprising instructions that, when executed, cause the one or more processors to resolve a risk condition by communicating with a remote device via the out-of-band connection during self-isolation.

23. A system comprising:

one or more network interfaces;

a machine-readable medium having stored thereon instructions that, when executed, cause one or more processors to perform a security analysis of the system, selectively logically disable one or more of the network interfaces in response to results of the risk assessment analysis, and maintain an out-of-band network connection that is not accessible by a host operating system during the self-isolation to support remedial actions in response to the results of the security analysis.

24. The system of claim 23 wherein the instructions that cause the one or more processors to perform the security analysis comprise instructions that, when executed, cause the one or more processors to search files of the host electronic system for predetermined indications corresponding to one or more conditions, and generate an indication of a risk condition, if one or more of the predetermined conditions is found on the host electronic system.

25. The system of claim 23 wherein the predetermined indications comprise one or more of: lack of communication from a component of the host electronic system within a predetermined period of time, lack of current security patches, operating during pre-selected hours and positive results from a virus or memory scan.

26. The system of claim 23 wherein the instructions that cause the one or more processors to selectively self-isolate the system by disabling one or more network interfaces comprise instructions that, when executed, cause the one or more processors to analyze the analysis result to determine whether one or more conditions exists, and logically disable one or more of the network interfaces in response to a positive determination that one or more conditions exists.

27. The system of claim 26 wherein the instructions that cause the one or more processors to logically disable one or more network interfaces in response to a positive determination that one or more conditions exists comprise instructions that, when executed, cause the one or more processors to write a pre-selected value to a control register corresponding to the one or more network interfaces to be logically disabled using a configuration operation.

* * * * *